June 4, 1963
A. R. JOHNSTON
3,091,972
ACCELEROMETER
Filed Jan. 24, 1961
2 Sheets-Sheet 1
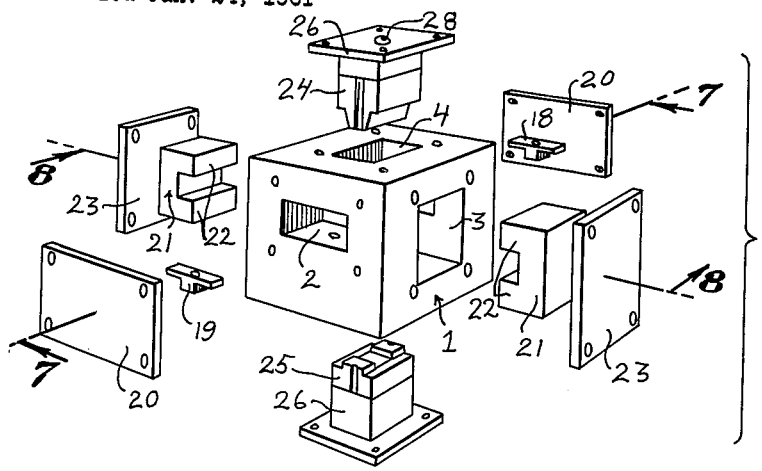
FIG. 1
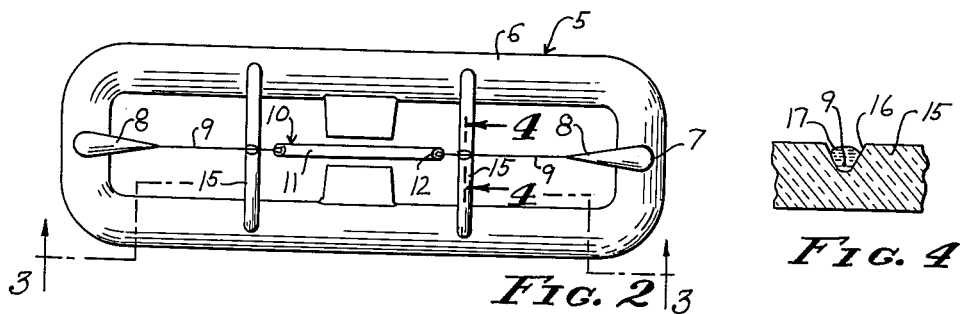
FIG. 2
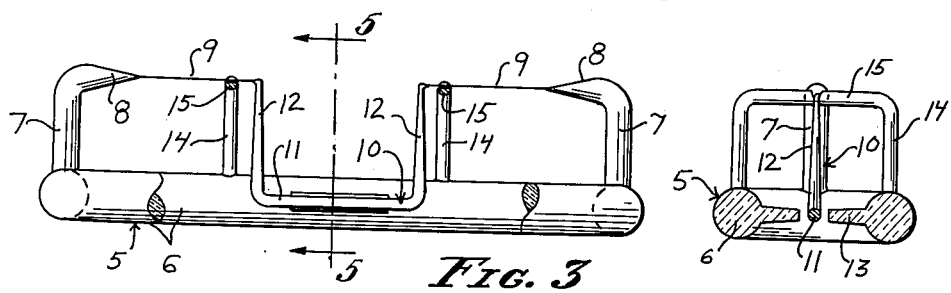
FIG. 3
FIG. 4
FIG. 5
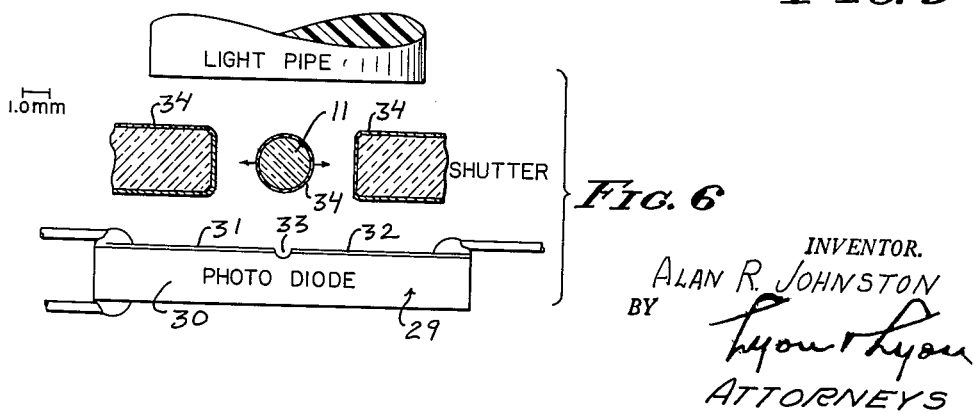
FIG. 6
INVENTOR.
ALAN R. JOHNSTON
BY
*[signature]*
ATTORNEYS INVENTOR.
ALAN R. JOHNSTON
BY Lyon & Lyon
ATTORNEYS United States Patent Office 3,091,972
Patented June 4, 1963

3,091,972
ACCELEROMETER
Alan R. Johnston, La Canada, Calif., assignor to California Institute Research Foundation, Pasadena, Calif., a corporation of California
Filed Jan. 24, 1961, Ser. No. 84,720
8 Claims. (Cl. 73—517)

This invention relates to accelerometers, and included in the objects of this invention are:

First, to provide an accelerometer which incorporates a novel sensing structure formed of fused quartz including coaxial quartz torsion fibers and a pendulum bar suspended therebetween in such a manner as to be subject to acceleration forces perpendicular to a plane through the torsion fibers and pendulum bar, thereby providing a sensing structure which, by utilizing the great strength and ideal spring rate characteristics of fused quartz fibers of small cross section, may have extremely small dimensions and therefore be inherently rugged.

Second, to provide an accelerometer having a fused quartz sensing structure which is provided with a conductive coating such as gold so that current may be conducted to the suspended mass or pendulum bar without flexible leads or other means which would introduce frictional losses.

Third, to provide an accelerometer of this type wherein the pendulum bar is suspended in a magnetic field in cooperative relation with a means for detecting displacement of the pendulum bar from a neutral position under influence of an acceleration force along an axis perpendicular to the plane defined by the axes of the quartz torsion fibers and the pendulum bar, the detecting means being utilized to control the direction and intensity of a feedback current to the coating on the pendulum bar, thereby to apply a restoring force which is a measure of the strength of the acceleration force and its direction along said perpendicular axis.

Fourth, to provide an accelerometer of this type which incorporates as its displacement detecting means a novel diode photosensitive cell, a light source and shutter means so arranged as to be dimensioned commensurately with the small size of the sensing structure.

With the above and other objects in view as may appear hereinafter, reference is directed to the accompanying drawings, in which:

FIGURE 1 is an exploded perspective view of the accelerometer showing the mechanical and magnetic parts thereof.

FIGURE 2 is an enlarged plan view of the sensing assembly.

FIGURE 3 is a partial side view, partial sectional view thereof taken through 3—3 of FIG. 2.

FIGURE 4 is a greatly enlarged fragmentary sectional view taken through 4—4 of FIG. 2 showing the manner in which the torsion fiber is dampened.

FIGURE 5 is a transverse sectional view through 5—5 of FIG. 3.

FIGURE 6 is a greatly exaggerated fragmentary view showing the relation of the acceleration sensing bar, light source, shutter and photocell.

Figure 7:
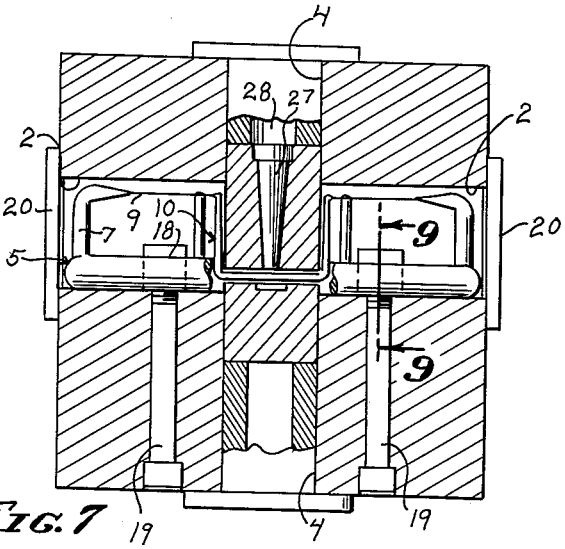
FIGURE 7 is an enlarged sectional view of the assembled accelerometer taken substantially through 7—7 of FIG. 1.

The accelerometer is mounted in a body 1 which may be in the form of a cube. Extending between two sides of the body is a sensing assembly cavity 2. Extending between two other sides of the body 1 is a magnet cavity 3. Extending between the remaining two sides of the body 1 is a pole piece cavity 4.

The sensing assembly cavity 2 receives an acceleration sensing assembly 5 which is formed in its entirety of fused quartz. The assembly includes a base frame 6 in the form of a rectangular loop. Extending upwardly from the extremities of the base frame are two posts 7 having inturned tips 8 from which extend coaxial torsion fibers 9. The proximal ends of the torsion fibers 9 support therebetween a pendulous member 10 which is U-shaped in side aspect and includes a cross portion 11 which constitutes the sensing element and suspension arms 12 joined at their extremities to the torsion fibers 9.

The cross portion or sensing element 11 is disposed within the rectangle formed by the base frame 6. Extending from opposite sides of the base frame into proximity to the sensing element 11 are shutter elements 13. The sides of the base frame 6 are joined by a pair of inverted U-shaped brackets 14 having cross portions 15 which extend under the torsion fibers 9 adjacent their connections to the suspension arms 12. The cross portions 15 are provided with notches 16 to accommodate, but clear, the torsion fibers 9 as shown best in FIG. 4. A damping fluid 17, having high viscosity and low vapor pressure, is placed in the notches 16, for example, 1,000 centistoke silicone fluid.

It should be observed that the torsion fibers 9 have a diameter in the order of .0001 of an inch and may, in fact, be even smaller. The lengths of the torsion fibers may be in the order of five millimeters. The suspension arms 12 may also be in the order of five millimeters in length and the diameter of the sensing element 11 may be approximately two millimeters. These dimensions are not given by way of limitation, but to aid in visualizing the inherently small size of the instrument.

Figure 9:
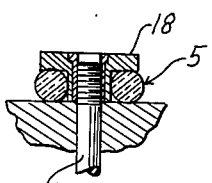
FIGURE 9 is a fragmentary sectional view through 9—9 of FIG. 7.

The acceleration sensing assembly 5 is held in place by means of T-shaped clamp nuts 18 which receive screws 19 extending upwardly through the body 1 as shown best in FIGS. 7 and 9. The pendulous member 10 is centered in the body 1 within the open space formed by the intersections of the magnet cavity 3 and pole piece cavity 4 with the sensing assembly cavity 2. The extremities of the sensing assembly cavity 2 are closed by cover plates 20.

The magnet cavity 3 receives a pair of opposed magnets 21 which are U-shaped and have legs 22. The ends of the magnet cavity 3 are closed by cover plates 23.

The pole piece cavity 4 receives an upper pole piece 24 and a lower pole piece 25. The pole pieces are supported on mounting blocks 26 having flanged ends which cover the ends of the pole piece cavity 4.

Figure 8:
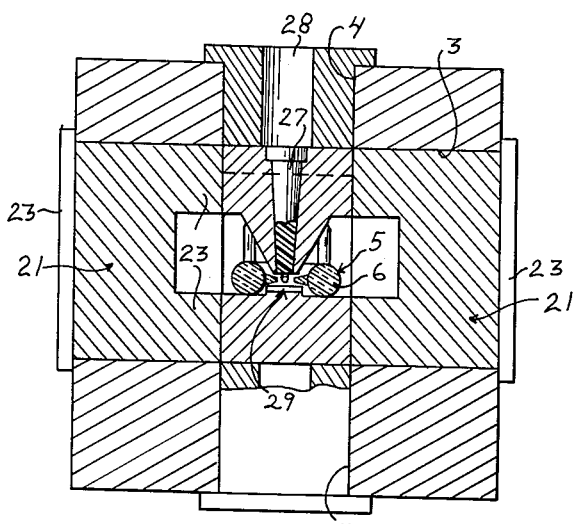
FIGURE 8 is a similar sectional view taken through 8—8 of FIG. 1.
Figure 10:
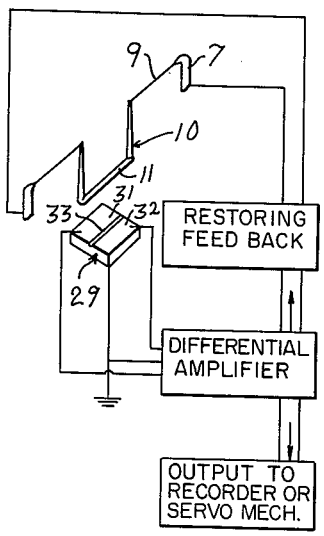
FIGURE 10 is a diagrammatical view showing the electrical relationship of the photocell diode and the sensing assembly.

The pole pieces fit between the legs of the magnets 21. The lower pole piece 25 is provided with a rudimentary raised portion terminating in close proximity to the sensing element 11. The upper pole piece 24 is provided with a downwardly tapering portion which also terminates in close proximity to the sensing element 11 as shown best in FIGS. 7 and 8. The upper pole piece is provided with an opening therethrough in which is fitted a light pipe 27 capable of efficiently conducting light to be directed against the sensing element 11. The mounting block for the upper pole piece is provided with a cavity 28 in which is mounted a miniature lamp, not shown.

The lower pole piece 25 is provided with a small recess in which is fitted a photodiode 29. The photodiode includes a silicon wafer base having a light sensitive coating separated into two parts 31 and 32 by a groove 33 as shown best in FIG. 6. The photodiode is so positioned that the groove 33 is parallel with and underlies the sensing element 11.

Substantially the entire acceleration sensing assembly 5 is provided with an extremely thin conductive coating 34. For example, gold may be used. In particular, the coating is applied to the pendulous member 10 and to the torsion fibers 9 so that current may flow along the sensing element 11. The two coatings of the photodiode 29 and the wafer 30 are electrically connected to a differential amplifier 35 so arranged as to feed back current in one direction or the other to the sensing element 11. An output signal from the amplifier is supplied to a recorder or servo mechanism associated with the accelerometer.

Operation of the accelerometer is as follows:

The accelerometer is positioned so that the plane in which acceleration is to be measured is perpendicular to the plane defined by the pendulous member 10, that is, in the axis represented by the arrows in FIG. 6. The magnets and pole pieces maintain a strong magnetic field around the sensing element 11. The magnetic field is as uniform as possible. Light is applied through the light pipe 27 so as to pass between the sensing element 11 and the two shutter elements 13. If the sensing element 11 is not subject to accelerational forces, it occupies a neutral or centered position such as shown in FIG. 6 and the light is directed equally to both light sensitive coatings 31 and 32 of the photodiodes. As a consequence, the output current from the two coatings 31 and 32 are equal. As a consequence, there is no feedback or current applied to the sensing element. When the sensing element is subjected to an acceleration force in the direction of either arrow in FIG. 6, the sensing element is displaced so that one sensitive coating receives more light than the other. As a consequence, feedback current is applied to the sensing element in the appropriate direction to unbalance the magnetic field in a direction which produces a restoring force on the sensing element 11 bringing it back to its neutral position shown in FIG. 6.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. An accelerometer, comprising: an acceleration force sensing unit including a pair of supporting posts, a pair of spaced coaxial torsion elements, and a pendulant mass suspended between the proximal ends of said torsion elements, said posts, elements and mass being formed integrally with each other of fused quartz, and a conductive coating on said posts, elements and mass; means for detecting displacement of said mass; means for establishing a magnetic field across said mass; and means responsive to said detecting means for applying a current to the conductive coating of said sensing unit and along said mass thereby to produce a restoring force opposing said acceleration force.

2. An accelerometer, comprising: an acceleration force sensing unit including a pair of supporting posts, a pair of spaced coaxial torsion elements, and a pendulant mass suspended between the proximal ends of said torsion elements, said posts, elements and mass being formed integrally with each other of fused quartz, and a conductive coating on said posts, elements and mass; a light source at one side of said mass; a diode photocell at the other side of said mass for detecting displacement of said mass in response to acceleration forces; means for establishing a magnetic field across said mass; and amplifier means responsive to said diode photocell and having a current output electrically connected with said sensing unit to produce a current along said mass and in such direction with respect to said magnetic field as to produce a restoring force opposing said acceleration force.

3. In an accelerometer, an acceleration force sensing unit, comprising: a bar; a pair of arms extending radially from said bar in a common plane and forming the sole support therefor; torsion elements extending coaxially in opposite direction from said arms and in parallelism with the axis of said bar; support means for said torsion elements joined thereto at their distal ends and applying tension thereto, whereby said bar forms a suspended pendulant mass adapted to move about the common axis of said torsion elements in response to acceleration forces applied in a direction perpendicular to the common plane defined by the axes of said torsion elements and said bar, fixed cross members traversing said torsion elements adjacent said arms and having notches therein clearing said torsion elements; and a non-wetting viscous damping fluid tending by reason of its surface tension to fill said notches and surround said torsion elements.

4. An acceleration sensing unit as set forth in claim 3 wherein: said bar, arms, torsion elements and support means are formed of fused quartz and are fused together to form an integral structure.

5. An accelerometer, comprising: an acceleration sensing unit including, a bar, a pair of arms extending radially from said bar in a common plane, torsion elements extending coaxially in opposite direction from said arms and in parallelism with the axis of said bar, and support means for said torsion elements joined thereto at their distal ends and applying tension thereto, whereby said bar forms a suspended pendulant mass adapted to move about the common axis of said torsion elements in response to acceleration forces applied in a direction perpendicular to the common plane defined by the axes of said torsion elements and said bar, said sensing unit being formed of fused quartz and the parts thereof being integrally connected, and a conductive coating on said parts; a light source at one side of said mass; a diode photocell at the other side of said mass for detecting displacement of said mass in response to acceleration forces; means for establishing a magnetic field across said mass; and means responsive to said sensing unit for applying a current to the conductive coating of said sensing unit and along said mass thereby to produce a restoring force opposing said acceleration force.

6. A sensing unit for accelerometers, comprising:
 (a) a rectangular base frame; upstanding posts at the ends of said base frame;
 (b) coaxial torsion filaments extending from said posts toward each other;
 (c) a pair of suspension arms joined to the proximal ends of said torsion filaments;
 (d) a pendulant mass connecting said arms and disposed between the sides of said base frame;
 (e) and stop means extending inwardly from said sides toward said pendulant mass;
 (f) said base frame, posts, torsion elements, arms, pendulant mass and stops all being formed of fused quartz and integrally joined to form a single piece unit.

7. An accelerometer, comprising:
 (a) an acceleration force sensing unit including a pendulant mass in the form of a bar having an opaque conductive coating;
 (b) a light source at one side of said bar to cast a shadow thereof;
 (c) a pair of photocells at the other side of said mass, said photocells having contiguous straight sides forming a gap parallel to said bar and less than the width thereof;
 (d) means for establishing a magnetic field across said bar;
 (e) an amplifier responsive to said photocells and electrically connected with said conductive coating to produce a current in said bar in a direction to produce a restoring force opposing an acceleration force tending to displace said bar with respect to said photocells.

8. An accelerometer, comprising:
(a) an acceleration force sensing unit including coaxial spaced torsion elements, suspension arms joined to the proximal ends of said torsion elements, and a pendulant mass in the form of a bar extending between said arms said mass having a conductive coating;
(b) pole pieces contiguous to opposite sides of said mass, one of said pole pieces extending between said suspension arms;
(c) magnets connected with said pole piece to produce a concentrated magnetic field across said bar shaped mass;
(d) a light conducting means extending through one of said pole pieces and directed across said mass;
(e) a photocell means disposed on the other of said pole pieces at the opposite side of said mass from said light conducting means for detecting displacement of said mass in response to an acceleration force in a direction perpendicular to said pole pieces;
(f) and means responsive to said photocell means for producing a current in the conductive coating on said mass to produce a restoring force opposing said acceleration force.

References Cited in the file of this patent
UNITED STATES PATENTS

| | | |
|---|---|---|
| 2,130,648 | Smith | Sept. 20, 1938 |
| 2,367,126 | James | Jan. 9, 1945 |
| 2,542,018 | Ferrill | Feb. 20, 1951 |
| 2,873,103 | Hautly | Feb. 10, 1959 |
| 2,946,226 | Wendt | July 26, 1960 |
| 2,947,176 | Perry | Aug. 2, 1960 |